(12) United States Patent
Matsuura et al.

(10) Patent No.: US 9,248,863 B2
(45) Date of Patent: Feb. 2, 2016

(54) VEHICLE BODY SUPERSTRUCTURE

(71) Applicant: HONDA MOTOR CO., LTD., Tokyo (JP)

(72) Inventors: Hirokazu Matsuura, Wako (JP); Masami Yaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/360,098

(22) PCT Filed: Oct. 1, 2012

(86) PCT No.: PCT/JP2012/075335
§ 371 (c)(1),
(2) Date: May 22, 2014

(87) PCT Pub. No.: WO2013/077085
PCT Pub. Date: May 30, 2013

(65) Prior Publication Data
US 2014/0312657 A1    Oct. 23, 2014

(30) Foreign Application Priority Data

Nov. 25, 2011 (JP) ................................. 2011-257511

(51) Int. Cl.
*B62D 25/06* (2006.01)
*B62D 25/04* (2006.01)
(Continued)

(52) U.S. Cl.
CPC .............. *B62D 25/06* (2013.01); *B62D 21/157* (2013.01); *B62D 25/04* (2013.01); *B62D 27/023* (2013.01)

(58) Field of Classification Search
CPC ........ B62D 25/02; B62D 25/04; B62D 25/06; B62D 27/02; B62D 27/023

USPC ............................................. 296/155, 203.03
See application file for complete search history.

(56) References Cited

U.S. PATENT DOCUMENTS 5,603,581 A * 2/1997 Fujita et al. .................... 403/272
6,299,241 B1 * 10/2001 Heya et al. ................ 296/203.03
(Continued)

FOREIGN PATENT DOCUMENTS

CN    1746066    3/2006
EP    0941913    9/1999
(Continued)

OTHER PUBLICATIONS

International Search Report filed in PCT/JP2012/075335, date of mailing: Nov. 13, 2012.
(Continued)

*Primary Examiner* — Jason S Daniels
(74) *Attorney, Agent, or Firm* — Rankin, Hill & Clark LLP (57) ABSTRACT

A vehicle body superstructure includes a roof side rail having a rail flange upon which a roof panel is mounted, a vertical rail wall that hangs down from the outer end of the rail flange in the vehicle width direction, a bottom rail wall that extends from the lower end of the vertical rail wall to the outside in the vehicle width direction, and a bulging section formed by allowing the bottom rail wall and the vertical rail wall to bulge toward the center in the vehicle width direction, in order to accommodate a slide rail for a sliding door. The outer end of a roof arch in the vehicle width direction is joined to the bulging section. First arch flanges are joined on the lower surface side of the rail flange. Second arch flanges are joined to the lower surface side of the of the bottom rail wall.

6 Claims, 12 Drawing Sheets

(51) Int. Cl.
*B62D 21/15* (2006.01)
*B62D 27/02* (2006.01)

(56) References Cited

U.S. PATENT DOCUMENTS

| | | | |
|---|---|---|---|
| 6,709,045 B2 * | 3/2004 | Shuto et al. | 296/155 |
| 6,976,730 B2 * | 12/2005 | Mally et al. | 296/203.03 |
| 7,900,997 B2 * | 3/2011 | Hosaka et al. | 296/193.12 |
| 2003/0085593 A1 | 5/2003 | Shuto et al. | |
| 2005/0212333 A1 | 9/2005 | Mally et al. | |
| 2005/0253422 A1 * | 11/2005 | Tomozawa | 296/203.03 |
| 2010/0140982 A1 | 6/2010 | Hosaka et al. | |

FOREIGN PATENT DOCUMENTS

| | | |
|---|---|---|
| JP | 2005-319940 | 11/2005 |
| JP | 2008-213694 | 9/2008 |
| JP | 2009-056855 | 3/2009 |

OTHER PUBLICATIONS

European Search Report dated Jun. 3, 2015, 5 pages.
Chinese Office Action issued Aug. 27, 2015, 5 pages.

\* cited by examiner

FIG.11(a)
COMPARATIVE EXAMPLE

FIG.11(b)
COMPARATIVE EXAMPLE

FIG.12(a)
EMBODIMENT

FIG.12(b)
EMBODIMENT

VEHICLE BODY SUPERSTRUCTURE

TECHNICAL FIELD

The present invention relates to an improved vehicle body superstructure including a roof side rail extending longitudinally on and along an upper part of a vehicle body side section, a roof panel having a lateral outer end portion mounted on the roof side rail, and a roof arch extending in a vehicle width direction below the roof panel.

BACKGROUND ART

Vehicle body superstructures of the type concerned are known as disclosed in, for example, Patent Document 1, which include a roof side rail disposed in a front-rear direction of a vehicle body on and along an upper part of a vehicle body side section, a roof panel disposed on the roof side rail, a stepped portion formed on the roof side rail for mounting a slide rail, and a roof arch joined to a center pillar and the roof side rail. The center pillar and the roof arch are joined to the roof side rail at a position adjacent to a vertical wall forming a front end of the stepped portion.

According to the vehicle body superstructure, the pillar and the roof arch can be firmly joined to the roof side rail.

PRIOR ART LITERATURE

Patent Documents

[Patent Document 1] Japanese Patent Application Laid-open Publication (JP-A) No. 2005-319940

SUMMARY OF INVENTION

Technical Problem

In the vehicle body superstructure described in Patent Document 1, the roof arch is placed on the pillar (center pillar) and a cross-sectional part of the roof side rail, the roof arch is bolted to the pillar, and the front end of the roof arch is spot-welded to the roof side rail. In this joining structure, since the pillar is only bolted to the roof arch but has no continuity with roof side rail and the roof arch, stress concentration is likely to occur at a joint portion between the pillar and the roof side rail. When the pillar is subjected to a side collision load, a load transmitting path from the pillar to the roof arch tends to bend, failing to achieve smooth load transmission. Furthermore, a further improvement in the strength and rigidity of the vehicle body side section is desirable.

An object of the present invention is to provide a vehicle body superstructure which is capable of achieving efficient load transmission between a roof side rail and a roof arch and can improve the strength and rigidity against a side collision load acting on a vehicle body side section.

Solution to Problem

In the invention according to a first aspect, there is provided a vehicle body superstructure comprising: a roof side rail extending in a front-rear direction of a vehicle body on and along an upper part of a vehicle body side section; a roof panel having an outer end portion, in a vehicle width direction, thereof mounted on the roof side rail; and a roof arch extending in the vehicle width direction below the roof panel, characterized in that the roof side rail includes: a rail flange on which the roof panel is mounted; a rail vertical wall hanging down from an outer end, in the vehicle width direction, of the rail flange; a rail bottom wall extending from a lower end of the rail vertical wall to the outside in the vehicle width direction; and a bulging section formed by allowing the rail bottom wall and the rail vertical wall to bulge toward a center in the vehicle width direction in order to accommodate a slide rail for a sliding door, and the roof arch has: an outer end portion, in the vehicle width direction, thereof joined to the bulging section; first arch flanges joined to and along a lower surface of the rail flange; and second arch flanges joined to a lower surface of the rail bottom wall. Further, the rail flange is inclined upwardly toward the center in the vehicle width direction of the vehicle body.

In the invention according to a second aspect, preferably, the roof arch has a hat-shaped cross section defined by an arch bottom wall facing in opposite vertical directions of the vehicle body, an arch front wall and an arch rear wall rising, respectively, from front and rear ends of the arch bottom wall, an arch front flange extending forwardly from an upper end of the arch front wall, and an arch rear flange extending rearwardly from an upper end of the arch rear wall, wherein outer end portions, in the vehicle width direction, of the arch front and rear flanges constitute the first arch flanges, and wherein an outer end, in the vehicle width direction, of the arch bottom wall constitute the second arch flanges.

In the invention according to a third aspect, preferably, the roof side rail includes a rail front wall rising from a front end of the bulging section and being continuous with the rail vertical wall, and the rail front wall and the arch front wall are formed to be continuous with each other in the vehicle width direction.

In the invention according to a fourth aspect, preferably, the roof arch includes arch vertical flanges each extending continuously between one of the first arch flanges and an adjacent one of the second arch flanges, the arch vertical flanges extending along the rail vertical wall.

In the invention according to a fifth aspect, preferably, the roof arch includes an arch bead formed by protruding a longitudinal part of the arch bottom wall either in an upward direction or in a downward direction, the arch bead extending continuously between one of the first arch flanges and an adjacent one of the second arch flanges.

In the invention according to a sixth aspect, preferably, the vehicle body superstructure further comprises a pillar extending in a downward direction from joint portions between the roof side rail and the roof arch, wherein the pillar includes a pillar side wall facing in opposite vehicle width directions, a pillar front wall extending outward in the vehicle width direction from a front end of the pillar side wall, and a pillar rear wall extending outward in the vehicle width direction from a rear end of the pillar side wall, and wherein the pillar front wall, the rail front wall, and the arch front wall are formed to be continuous with one another in the vehicle width direction.

Advantageous Effects of Invention

In the invention according to the first aspect, the vehicle body superstructure comprises the roof side rail extending in the front-rear direction of the vehicle body on and along the upper part of the vehicle body side section, the roof panel having the outer end portion, in the vehicle width direction, thereof mounted on the roof side rail, and the roof arch extending in the vehicle width direction below the roof panel. The roof side rail includes the rail flange on which the roof panel is mounted, the rail vertical wall hanging down from the outer end, in the vehicle width direction, of the rail flange, the rail bottom wall extending from the lower end of the rail vertical wall to the outside in the vehicle width direction, and the bulging section formed by allowing the rail bottom wall and the rail vertical wall to bulge toward the center in the vehicle width direction in order to accommodate the slide rail for the sliding door. The roof arch has the outer end portion, in the vehicle width direction, thereof joined to the bulging section, the first arch flanges joined to and along the lower surface of the rail flange, and the second arch flanges joined to the lower surface of the rail bottom wall. Further, the rail flange is inclined upwardly toward the center in the vehicle width direction of the vehicle body. With the roof arch joined to the bulging section, load transmission between the roof side rail and the roof rail can be achieved with increased efficiency. Furthermore, since the first arch flanges and the second arch flanges support the roof side rail at two joint points of different heights one from a room interior side and the other from a vehicle lower side, the load transmission efficiency from the center pillar, for example, can be increased. This will lead to an improvement in the strength and rigidity against a side collision.

In the invention according to the second aspect, the roof arch has the hat-shaped cross section defined by the arch bottom wall facing in opposite vertical directions of the vehicle body, the arch front wall and the arch rear wall rising, respectively, from the front and rear ends of the arch bottom wall, the arch front flange extending forwardly from the upper end of the arch front wall, and the arch rear flange extending rearwardly from the upper end of the arch rear wall. The outer end portions, in the vehicle width direction, of the arch front and rear flanges constitute the first arch flanges, and the outer end, in the vehicle width direction, of the arch bottom wall constitutes the second arch flanges. By virtue of the hat-shaped cross section, the roof arch, as it is joined with the roof side rail, is able to support the roof side rail from below as well as from the room interior side. This arrangement insures improved load transmission efficiency from the center pillar, for example, which will increase the strength and rigidity against a side collision.

In the invention according to the third aspect, the roof side rail includes the rail front wall rising from the front end of the bulging section and being continuous with the rail vertical wall. The rail front wall and the arch front wall are formed to be continuous with each other in the vehicle width direction. With this arrangement, because the load transmission is performed between the arch front wall and the rail front wall that are substantially perpendicular to the direction of application of a side collision load, further improvement in the strength and rigidity against the side collision can be achieved.

In the invention according to the fourth aspect, the roof arch includes the arch vertical flanges each extending continuously between one of the first arch flanges and an adjacent one of the second arch flanges, the arch vertical flanges extending along the rail vertical wall. With this arrangement, because the first arch flanges and the second arch flanges that are joined with the roof side rail are connected by the respective arch vertical flanges, there are formed two ridges each extending between two adjacent ones of the joint portions. The thus formed ridges contribute to an increase in the strength and rigidity of the vehicle body side section.

In the invention according to the fifth aspect, the roof arch includes the arch bead formed by protruding the longitudinal part of the arch bottom wall either in the upward direction or in the downward direction in such a manner as to extend continuously between one of the first arch flanges and an adjacent one of the second arch flanges. With the arch bead thus formed, a plurality of ridges is formed between two adjacent ones of the joint portions. The ridges contribute to a further improvement in the strength and rigidity of the vehicle body side section.

In the invention according to the sixth aspect, the vehicle body superstructure further comprises the pillar extending in a downward direction from the joint portions between the roof side rail and the roof arch. The pillar includes the pillar side wall facing in opposite vehicle width directions, the pillar front wall extending outward in the vehicle width direction from the front end of the vehicle side wall, and the pillar rear wall extending outward in the vehicle width direction from the rear end of the pillar side wall. The pillar front wall, the rail front wall and the arch front wall are formed to be continuous with one another in the vehicle width direction. With this arrangement, when the pillar is subjected to a load at a side collision, the side collision load first acts on the pillar front wall which extends perpendicular to an incident direction of the side collision load. The side collision load is subsequently transmitted from the pillar front wall to the rail front wall and the arch front wall in succession. This load transmission mechanism can contribute to an improvement in the strength and rigidity against a side collision.

DESCRIPTION OF EMBODIMENTS

A certain preferred embodiment of the present invention will be described below in greater detail with reference to the accompanying sheets of drawings.

Embodiment

Figure 1:
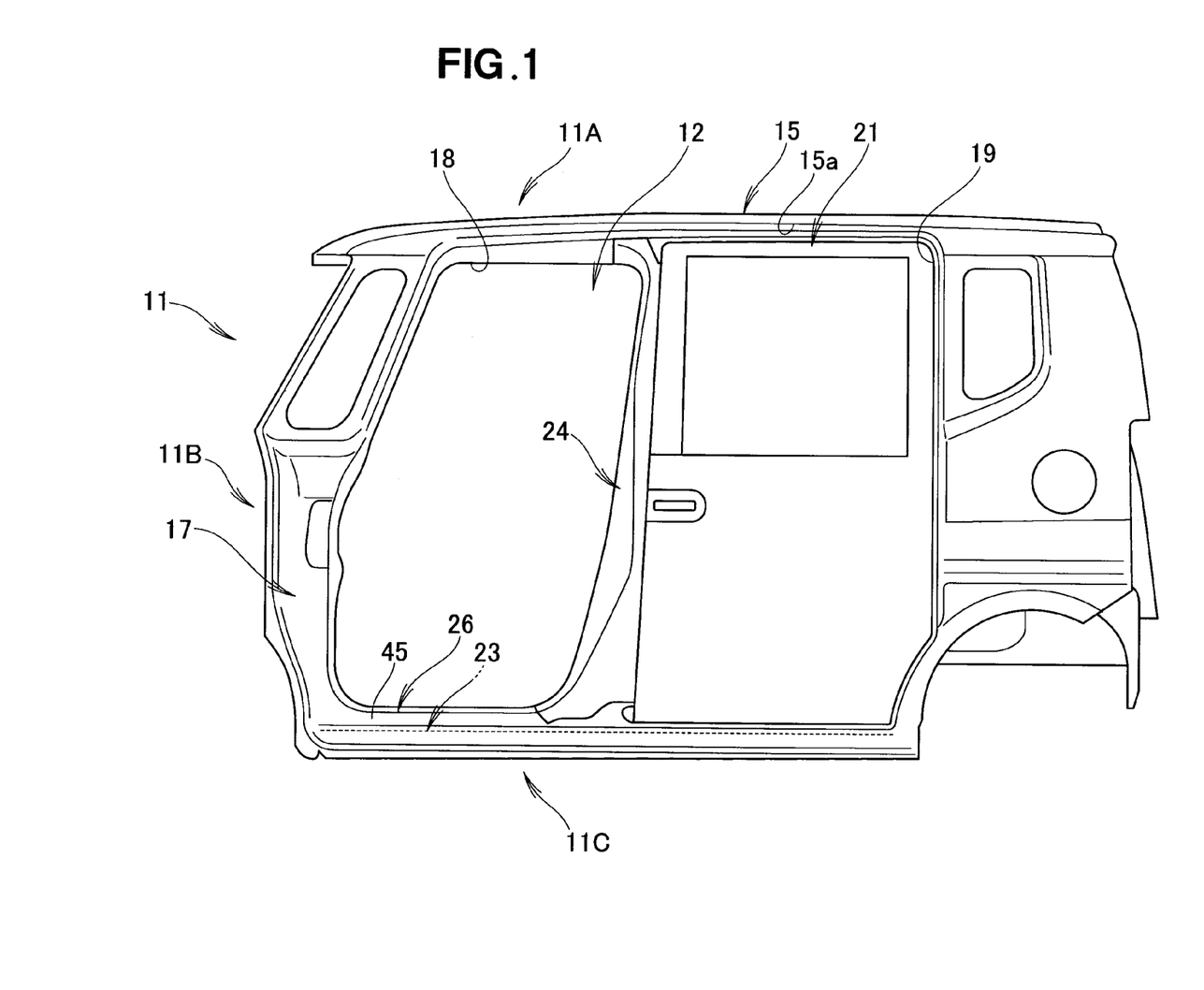
FIG. 1 is a side view of a vehicle body incorporating therein a vehicle body superstructure according to an embodiment of the present invention.
Figure 2:
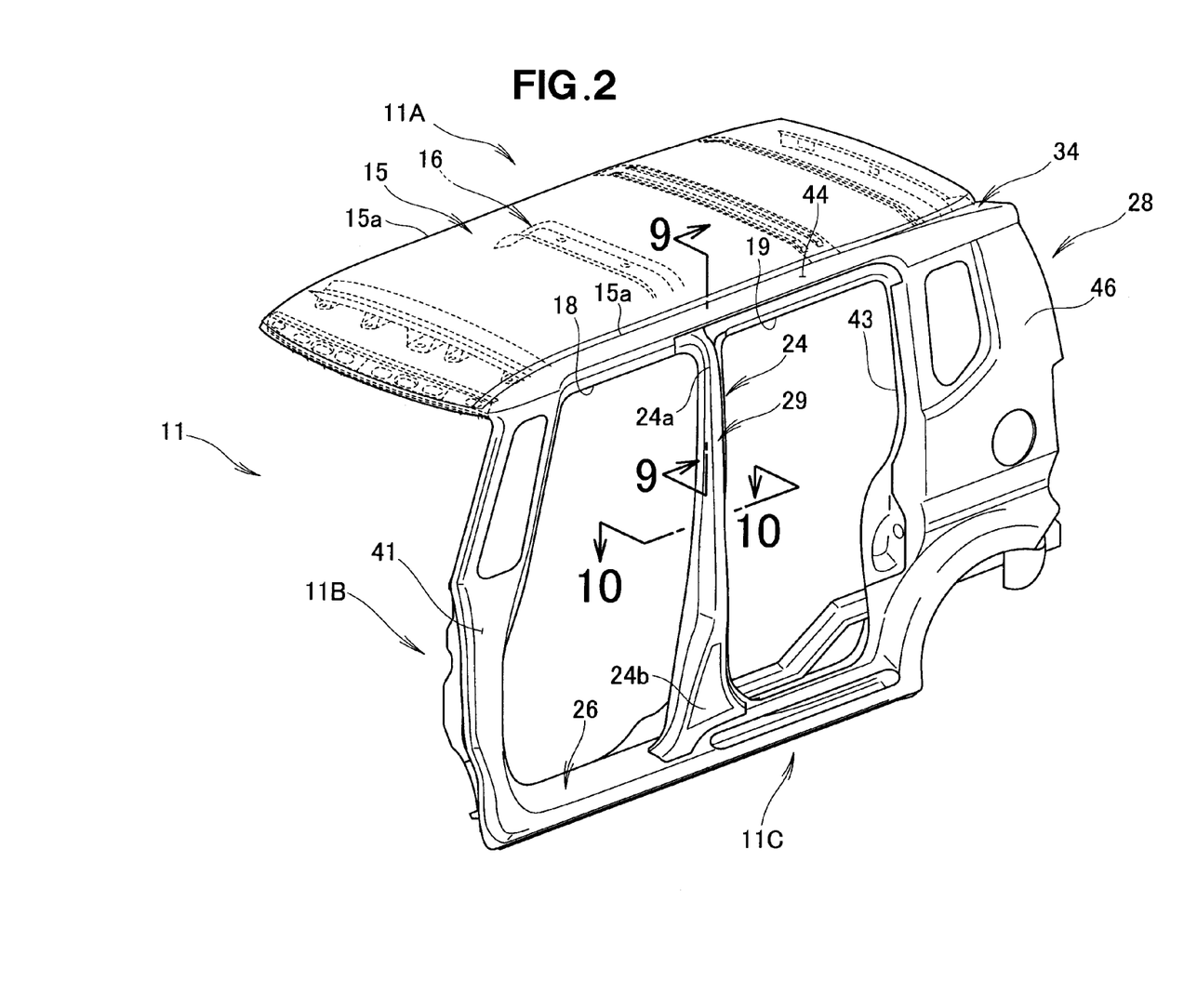
FIG. 2 is a perspective view of the vehicle body shown in FIG. 1.
Figure 3:
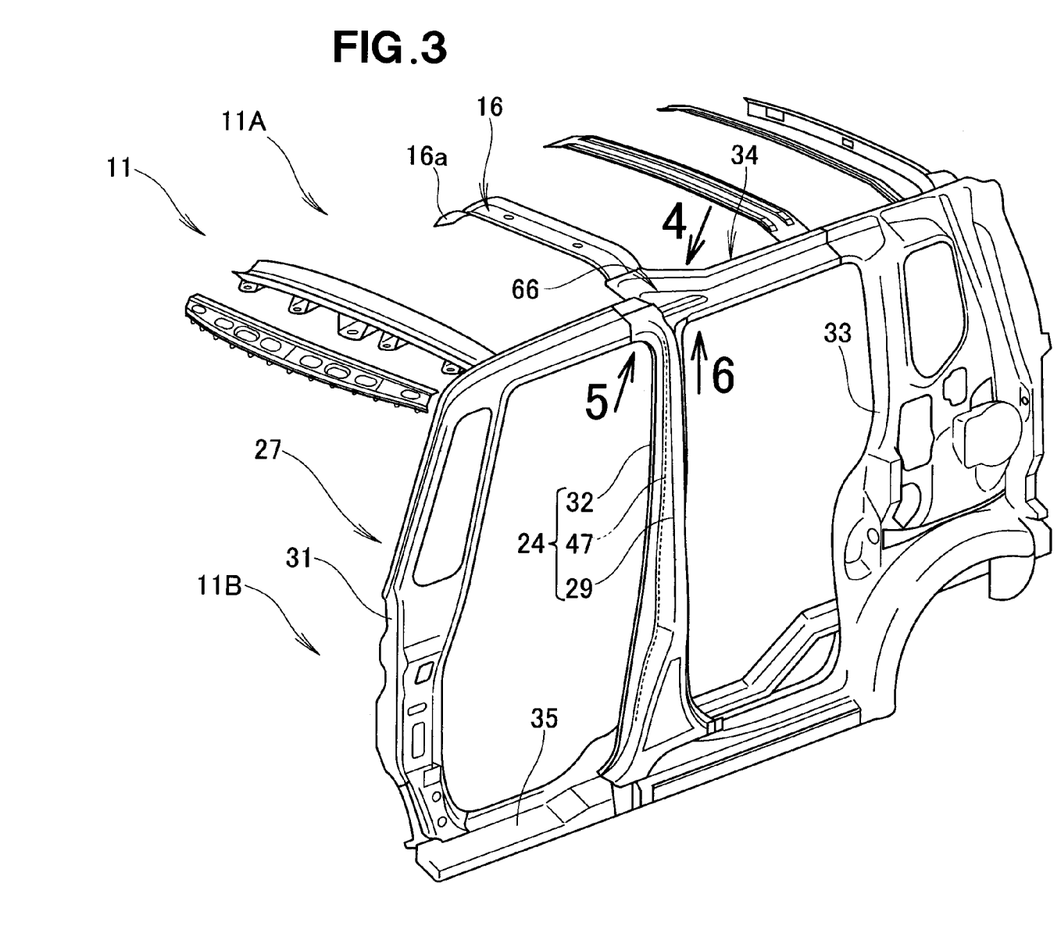
FIG. 3 is a perspective view of the vehicle body structure shown in FIG. 2 with a roof panel and an outer panel removed.

As shown in FIGS. 1 to 3, a vehicle body 11 generally comprises a roof panel 15 covering a vehicle body upper section 11A, a roof arch 16 supporting the roof panel 15, a side panel 17 covering a vehicle body side section 11B and having front and rear door openings 18, 19 formed therein, a sliding door 21 slidably mounted in the rear door opening 19, and a floor panel 23 covering a vehicle body lower section 11C.

The roof panel 15, the side panel 17, the sliding door 21 and the floor panel 23 are members jointly defining a passenger compartment 12.

The side panel 17 includes an inner frame 27 disposed on an interior side of the passenger compartment 12, a side outer panel (exterior panel) 28 disposed on an exterior side of the passenger compartment 12, and a center pillar outer member 29 extending vertically across the side outer panel 28. The inner frame 27 includes a front pillar inner section 31, a center pillar inner section 32, a rear pillar inner section 33, a roof side rail 34, and side sill inner section 35.

The side outer panel 28 includes a front pillar outer section (front pillar section) 41, a rear pillar outer section (rear pillar section) 42, a roof side rail outer section (roof side rail section) 44, a side sill outer section (side sill section) 45, and a rear fender 46.

Figure 8:
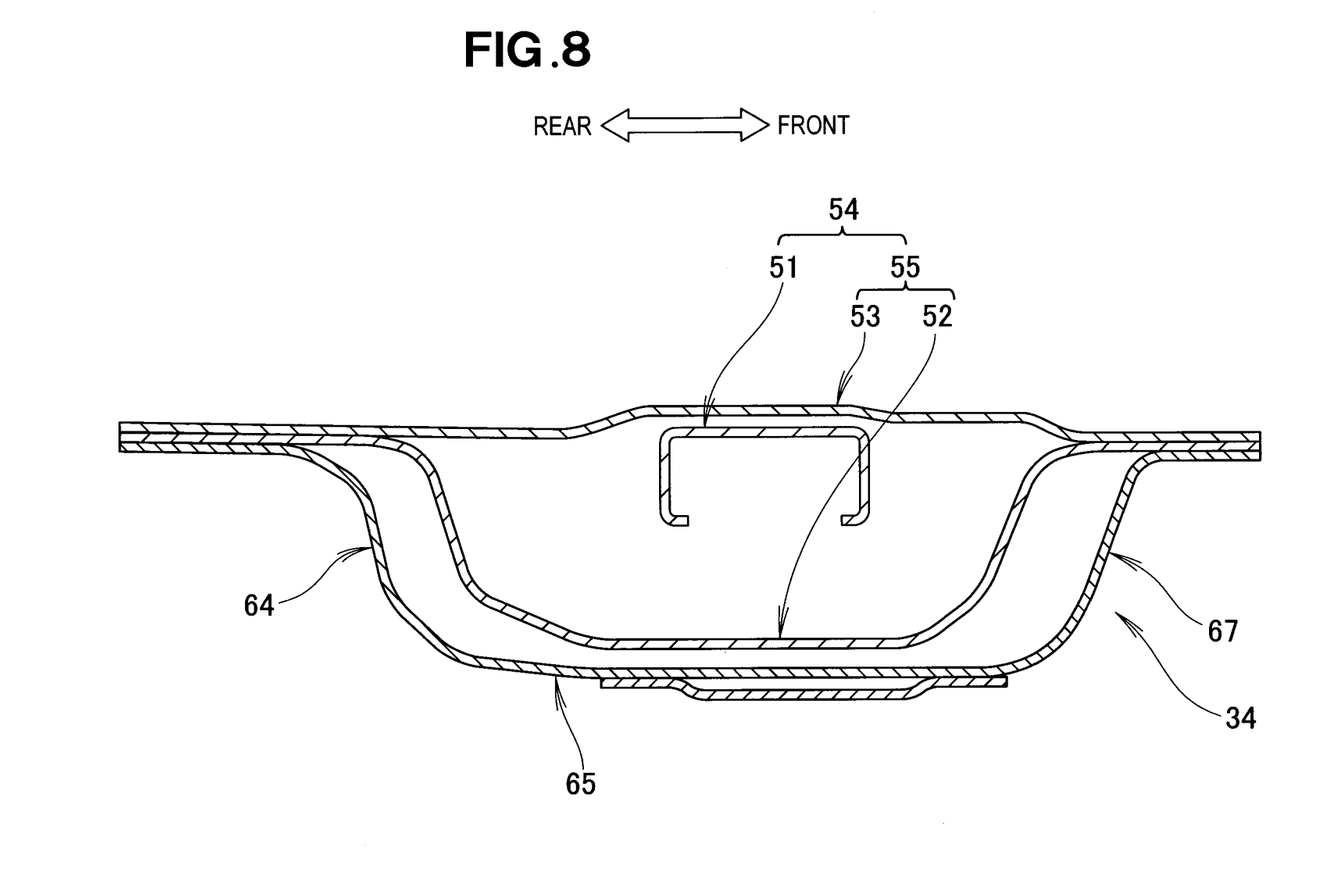
FIG. 8 is an enlarged cross-sectional view taken along the line 8-8 of FIG. 6.

A center pillar 24 is composed of the center pillar inner section 32, the center pillar outer section 29, and a center pillar stiffener 47. The roof side rail 34 has an upper part covered by the roof side rail section 44 of the side outer panel 28. A side sill 26 is composed of the side sill inner section 35 and the side sill section 45. A slide rail 51 (FIG. 8) for the sliding door 21 is disposed in the roof side rail 34.

As shown in FIG. 2, the vehicle body superstructure includes a roof side rail 34 extending in a front-rear direction of the vehicle body 11 on and along an upper part of the vehicle body side section 11b, the roof panel 15 having an outer end portion 15a, in a vehicle width direction, thereof mounted on the roof side rail 34, and the roof arch 16 extending in the vehicle width direction below the roof panel 15.

Figure 4:
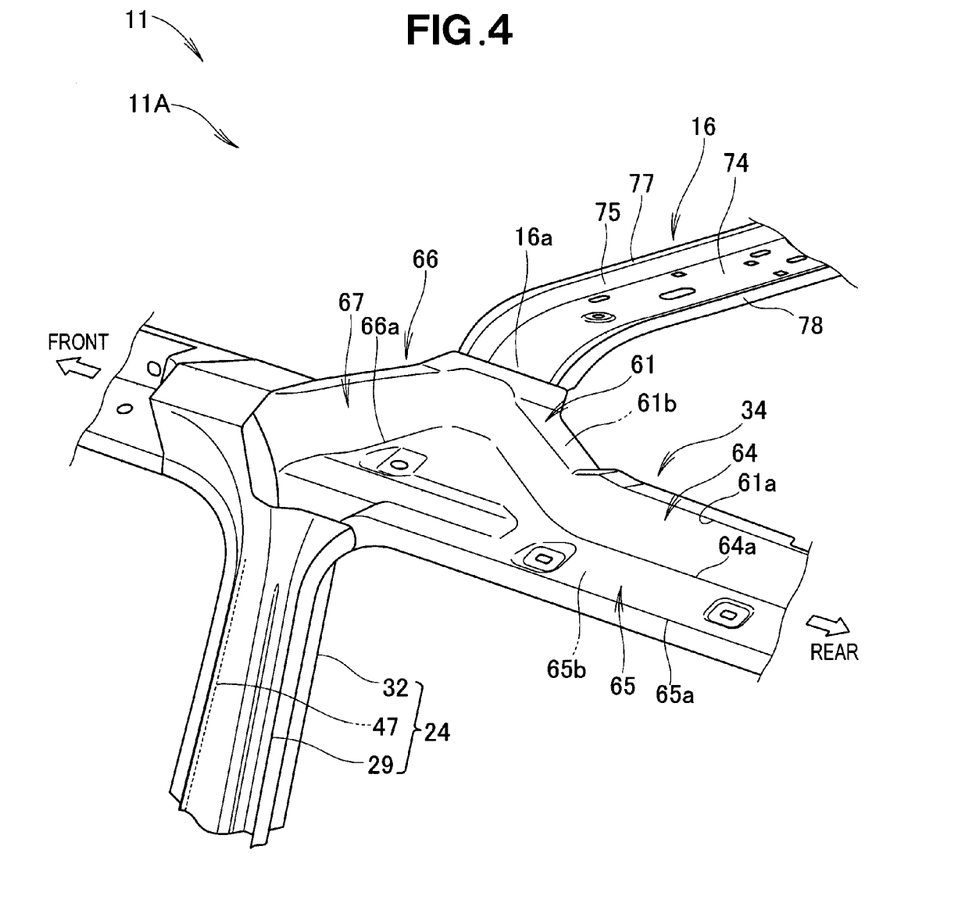
FIG. 4 is a view taken in the direction of the arrow 4 shown in FIG. 3.

As show in FIG. 4, the roof side rail 34 includes a rail flange 61 on which the roof panel 15 is mounted, a rail vertical wall 64 hanging down from an outer end 61a, in the vehicle width direction, of the rail flange 61, a rail bottom wall 65 extending outward in the vehicle width direction from a lower end 64a of the rail vertical wall 64, and a bulging section (slide rail accommodating section) 66 formed by allowing the rail bottom wall 65 and the rail vertical wall 64 to bulge toward a center in the vehicle width direction of the vehicle body 11.

Figure 9:
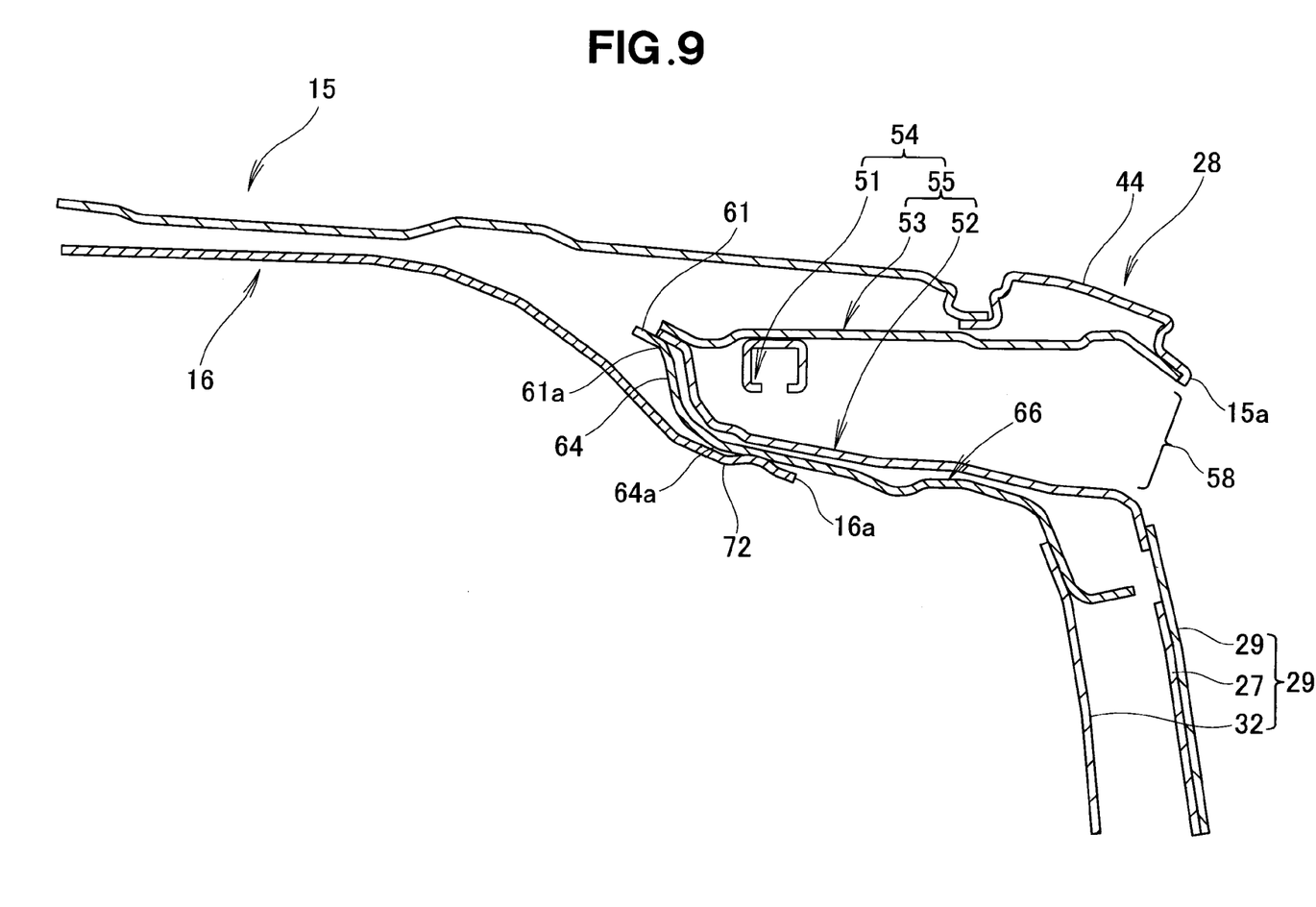
FIG. 9 is an enlarged cross-sectional view taken along the line 9-9 of FIG. 2.

As shown in FIG. 9, the bulging section 66 is a part for accommodating therein the slide rail 51 for the sliding door 21 (FIG. 1). The slide rail 51 is received in a space defined between a rail housing lower member 52 and a rail housing upper member 53. The rail housing lower member 52 and the rail housing upper member 53 together form a rail housing 55.

The slide rail 51 and the rail housing 55 (composed of the rail housing lower member 52 and the rail housing upper member 53) together constitute a rail housing component 54. The rail housing component 54 has a rail opening 58 for allowing the sliding door 21 (FIG. 1) to slide along the slide rail 51. Thus, the bulging section 66 is a part for receiving therein the rail housing component 54.

Figure 5:
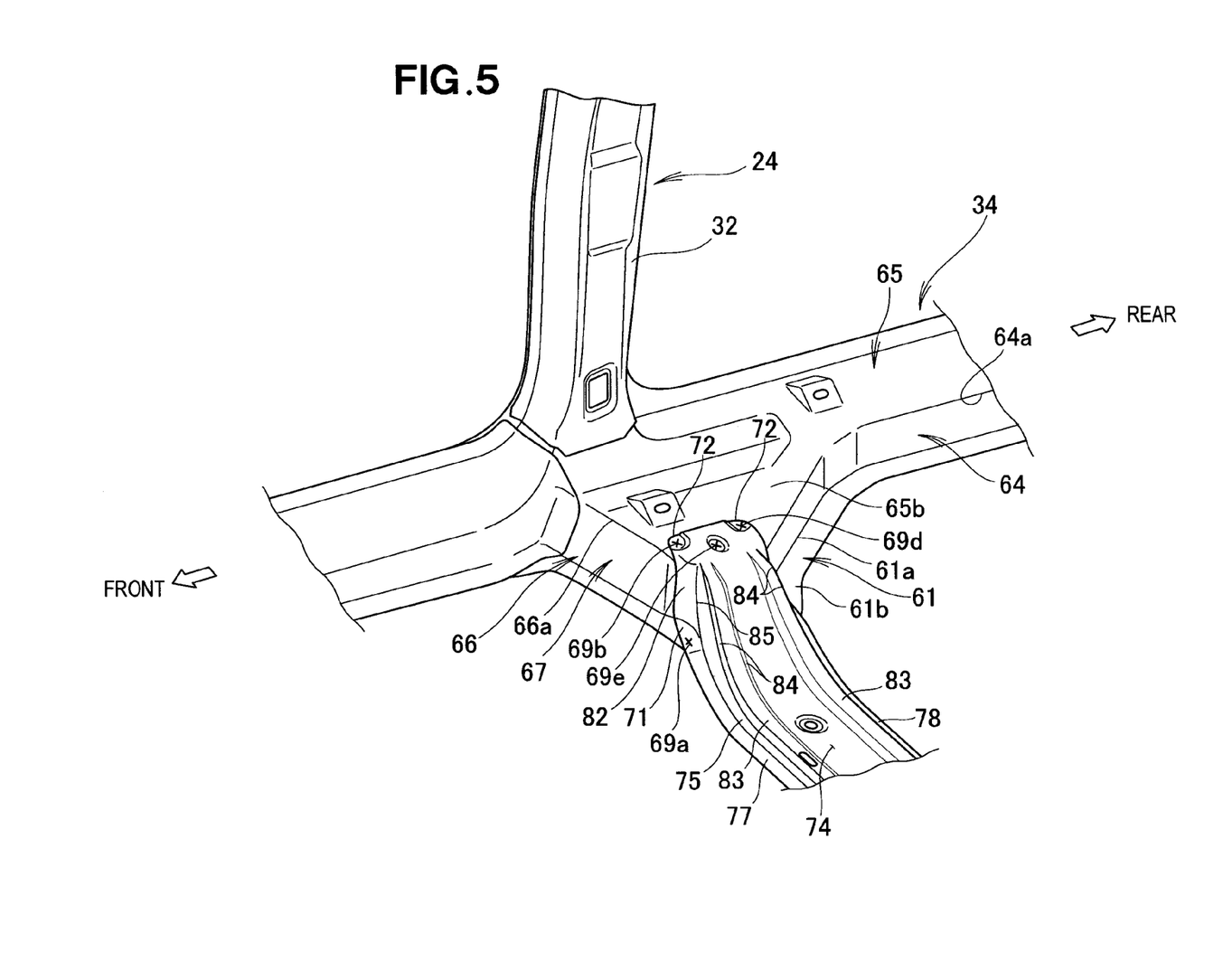
FIG. 5 is a view taken in the direction of the arrow 5 shown in FIG. 3.
Figure 6:
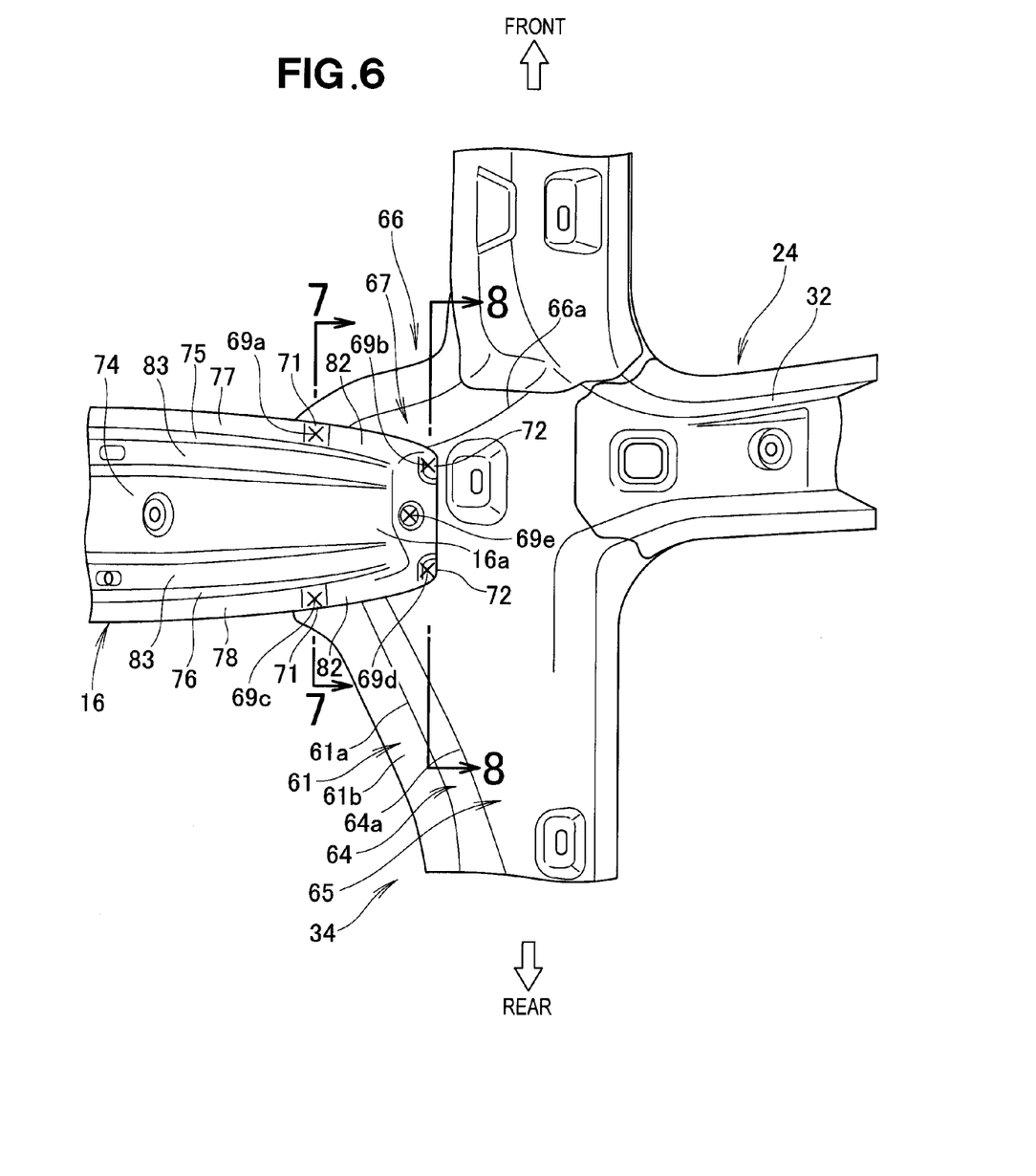
FIG. 6 is a view taken in the direction of the arrow 6 shown in FIG. 3.

As shown in FIGS. 4, 5 and 6, the roof side rail 34 includes a rail front wall 67 rising from a front end 66a of the bulging section 66 and being continuous with the rail vertical wall 64. The rail front wall 67 and an arch front wall 75 are formed to be continuous with each other in the vehicle width direction.

Figure 7:
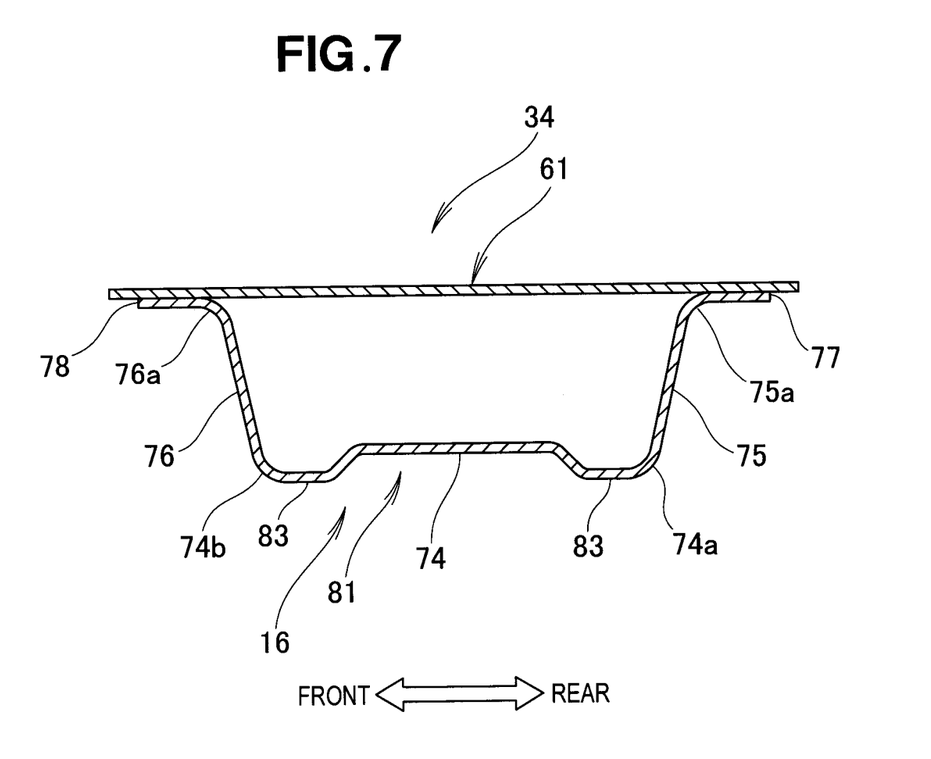
FIG. 7 is an enlarged cross-sectional view taken along the line 7-7 of FIG. 6.

As shown in FIGS. 5 and 7, the roof arch 16 has an outer end portion 16a, in the vehicle width direction, thereof joined to the bulging section 66, first arch flanges 71, 71 joined to and along a lower surface 61b of the rail flange 61, second arch flanges 72, 72 joined to a lower surface 65b of the rail bottom wall 65, the arch front wall 75 and an arch rear wall 76 rising, respectively, from front and rear ends 74a, 74b (FIG. 7) of the arch bottom wall 74, an arch front flange 77 extending forwardly from an upper end 75a of the arch front wall 75, and an arch rear flange 78 extending rearwardly from an upper end 76a of the arch rear wall 76. Further, the rail flange 61 is inclined upwardly toward the center in the vehicle width direction of the vehicle body.

The roof arch 16 has a hat-shaped cross section defined by the arch bottom wall 74, the arch front wall 75, the arch rear wall 76, the arch front flange 77, and the arch rear flange 78, as shown in FIG. 7. The first arch flanges 71, 71 are outer end portions, in the vehicle width direction, of the arch front and rear flanges 77 and 78, as shown in FIG. 7.

The first arch flanges 71, 71 and the second arch flanges 72, 72 are arranged in a vehicle height direction, and the second arch flanges 72, 72 are located at an outer end, in the vehicle width direction, of the arch bottom wall 74.

As shown in FIG. 6, the roof arch 16 includes arch vertical flanges 82, 82 each extending continuously between one of the first arch flanges 71, 71 and an adjacent one of the second arch flanges 72, 72. The arch vertical flanges 82, 82 extend along the rail vertical wall 64 at different locations.

Furthermore, as shown in FIG. 7, the roof arch 16 also includes arch beads 83, 83 formed by downwardly protruding longitudinal parts of the arch bottom wall 74. The arch beads 83, 83 may be formed by upwardly protruding the longitudinal parts of the arch bottom wall 74.

As shown in FIG. 6, the first arch flanges 71, 71, the arch vertical flanges 82, 82, and the second arch flanges 72, 72 are formed continuously in the named order from the arch front and rear flanges 77, 78 toward the outer end, in the vehicle width direction, of the roof arch 16. Each of the arch beads 83, 83 is formed to interconnect one of the first arch flanges 71, 71 and an adjacent one of the second arch flanges 72, 72.

The pillar (center pillar) 24 extends in a downward direction from joint portions 69a-69e between the roof side rail 34 and the roof arch 16. The joint portions 69a-69e formed between the roof side rail 34 and the roof arch 16 are spot-welded joint portions.

Figure 10:
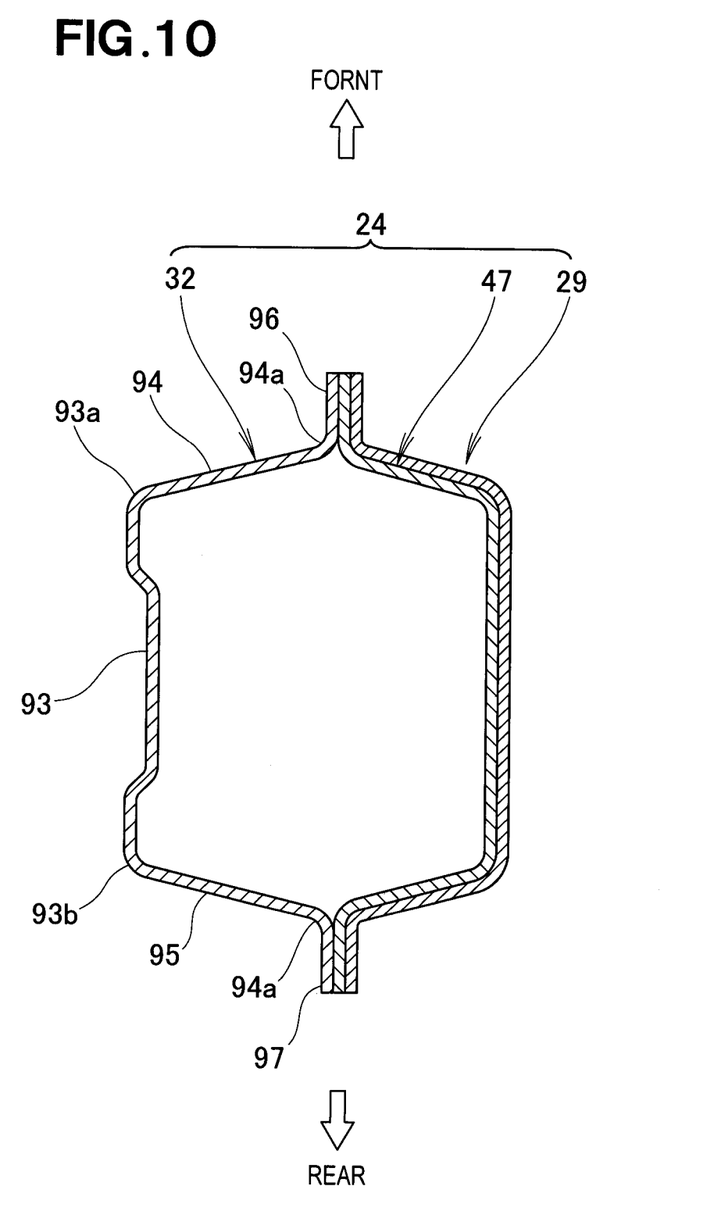
FIG. 10 is an enlarged cross-sectional view taken along the line 10-10 of FIG. 2.

As shown in FIG. 10, the center pillar 24 include a pillar side wall 93 facing in opposite vehicle width directions, a pillar front wall 94 extending outward in the vehicle width direction from a front end 93a of the pillar side wall 93, and a pillar rear wall 95 extending outward in the vehicle width direction from a rear end 93b of the pillar side wall 93. The pillar front wall 94, the rail front wall 67 (FIG. 5), and the arch front wall 75 (FIG. 7) are formed so as to be continuous with one another in the vehicle width direction.

Figure 11A:
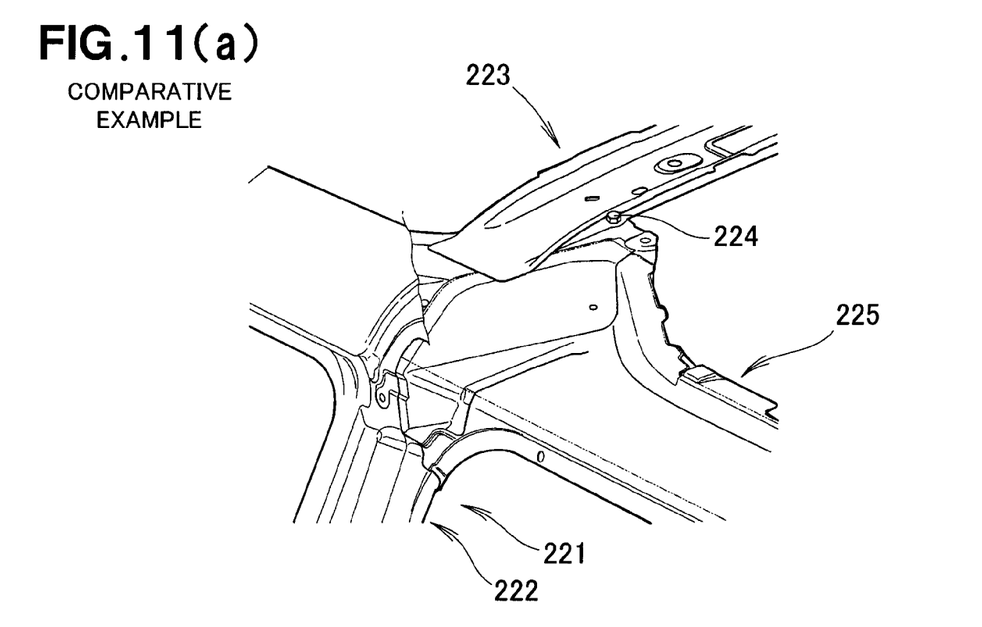
FIG. 11(a) is a perspective view of a vehicle body superstructure according to a comparative example.
Figure 11B:
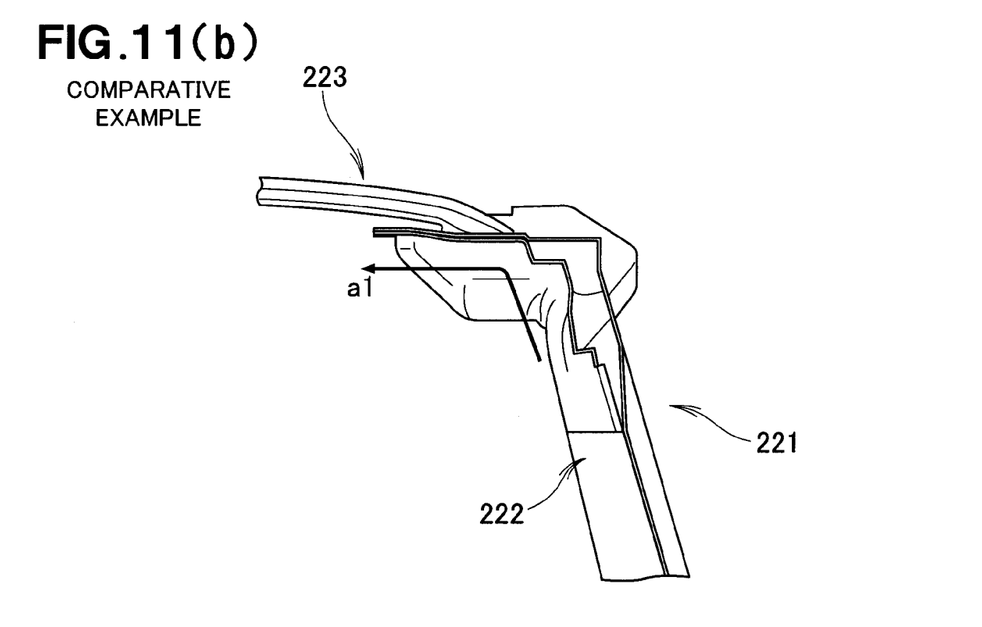
FIG. 11(b) is a schematic cross-sectional view of the vehicle body superstructure according to the comparative example.

FIGS. 11(a) and 11(b) show a conventional vehicle body superstructure as a comparative example. As shown in FIG. 11(a), the vehicle body superstructure according to the comparative example includes a center pillar 221 having a center pillar inner member 222, and a roof arch 223 mounted on the center pillar inner member 222. In this vehicle body superstructure, the roof arch 223 is joined by bolts (one being shown) 224 to the center pillar inner member 222 of the center pillar 221, and a lateral outer end portion of the roof arch 223 is spot-welded to a roof side rail 225.

As shown in FIG. 11(b), in the vehicle body superstructure according to the comparative example, because the roof arch 223 is mounted on the center pillar inner member 222 of the center pillar 221 and joined by the bolts 224 (FIG. 11(a)) to the center pillar inner member 222, a load acting on the center pillar 221 during side collision is transmitted from the center pillar 221 to the roof arch 223 along a load transmission path that is bent as indicated by the arrow a1. Thus, the load transmission efficiency of the conventional vehicle body superstructure is considerably low.

Figure 12A:
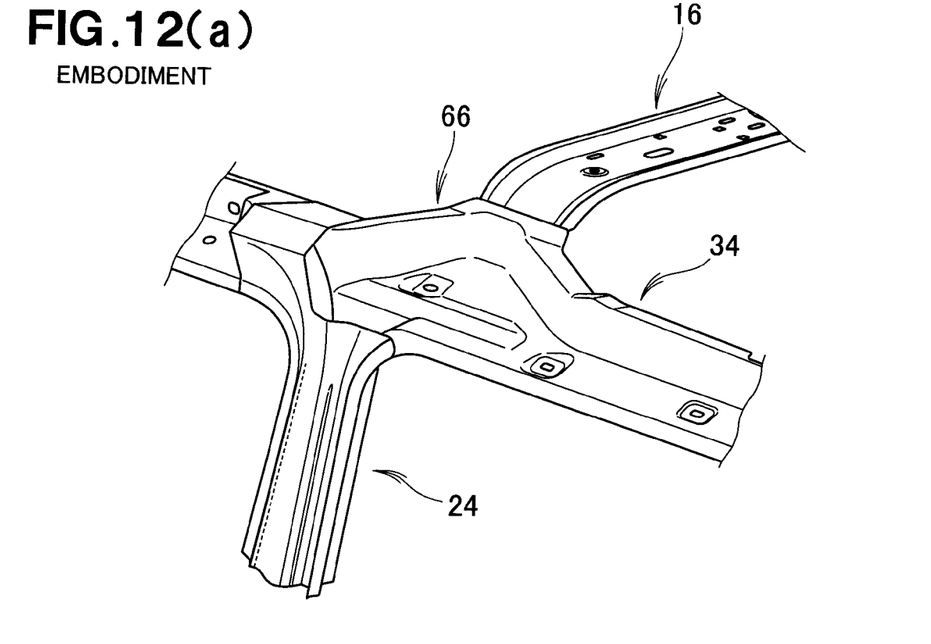
FIG. 12(a) is a perspective view of the vehicle body superstructure according to the embodiment of the invention.
Figure 12B:
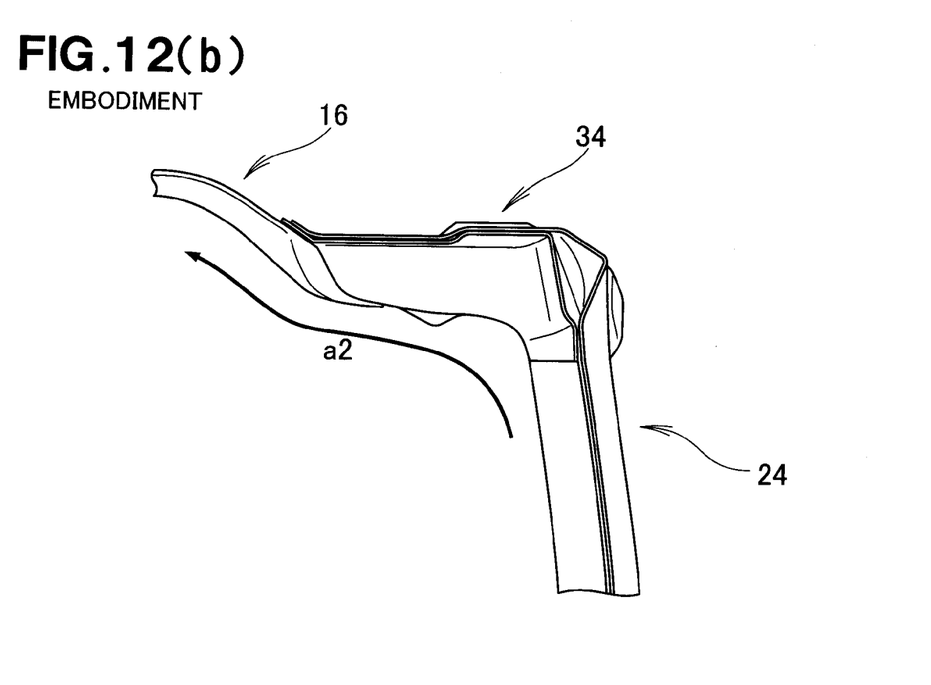
FIG. 12(b) is a schematic cross-sectional view of the vehicle body superstructure according to the embodiment of the invention.

FIGS. 12(a) and 12(b) show the vehicle body superstructure according to the embodiment of the invention. As shown in FIG. 12(a), the vehicle body superstructure according to the embodiment, the pillar 24 extends downward from the joint portions 69a-69e (FIG. 6) between the roof side rail 34 and the roof arch 16. The roof side rail 34 includes the bulging section (door pocket) 66 formed therein for accommodating therein the slide rail 51 (FIG. 9) for the sliding door 21 (FIG. 1). The roof arch 16 is joined by spot welding at plural spot welding points arranged to extend along the bulging section 66.

As shown in FIG. 12(a), in the vehicle body superstructure according to the embodiment of the invention, when the center pillar 24 is subjected to a load applied thereto during side collision, the load is smoothly transmitted from the center pillar 24 to the roof arch 16 along the bulging section (door pocket) 66, as indicated by the arrow a2. Thus, the load can be transmitted from the center pillar 24 to the roof arch 16 at a high efficiency.

As shown in FIGS. 1 to 10, the roof side rail 34 of the vehicle body superstructure includes the rail flange 61 on which the roof panel 15 is mounted, the rail vertical wall 64 hanging down from the outer end 61a, in the vehicle width direction, of the rail flange 61, the rail bottom wall 65 extending outward in the vehicle width direction from the lower end 64a of the rail vertical wall 64, and the bulging section 66 formed by allowing the rail bottom wall 65 and the rail vertical wall 64 to bulge toward the center in the vehicle width direction of the vehicle body 11 in order to accommodate the slide rail 51 for the sliding door 21.

As shown in FIG. 6, the roof arch 16 has the outer end portion 16, in the vehicle width direction, thereof joined to the bulging section 66, the first arch flanges 71, 71 joined to and along the lower surface 61b of the rail flange 61, and the second arch flanges 72 joined to the lower surface 65b of the rail bottom wall 65.

With the roof arch 16 joined to the bulging section 66, load transmission between the roof side rail 34 and the roof arch 16 can be achieved with increased efficiency. Furthermore, since the first arch flanges 71, 71 and the second arch flanges 72, 72 support the roof side rail 34 at two joint points of different heights one from a room interior side and the other from a vehicle lower side, the load transmission efficiency from the center pillar 24 can be further increased. This will lead to an improvement in the strength and rigidity against a side collision.

As shown in FIG. 7, in the vehicle body superstructure, the roof arch 16 has the hat-shaped cross section 81 defined by the arch bottom wall 74 facing in opposite vertical directions of the vehicle body 11, the arch front wall 75 and the arch rear wall 76 rising, respectively, from the front and rear ends 74a and 74b of the arch bottom wall 74, the arch front flange 77 extending forwardly from the upper end 75a of the arch front wall 75, and the arch rear flange 78 extending rearwardly from the upper end 76a of the arch rear wall 76. The outer end portions, in the vehicle width direction, of the arch front and rear flanges 77, 78 constitute the first arch flanges 71, 71, and the outer end, in the vehicle width direction, of the arch bottom wall 74 constitutes the second arch flanges 72, 72.

By virtue of the hat-shaped cross section 81, the roof arch 16, as it is joined with the roof side rail 34, is able to support the roof side rail 34 from below as well as from the room interior side. This arrangement insures improved load transmission efficiency from the center pillar 24, which will increase the strength and rigidity against a side collision.

As shown in FIG. 4, in the vehicle body superstructure, the roof side rail 34 includes the rail front wall 67 rising from the front end 66a of the bulging section 66 and being continuous with the rail vertical wall 64. The rail front wall 67 and the arch front wall 75 are formed to be continuous with each other in the vehicle width direction. With this arrangement, because the load transmission is performed between the arch front wall 75 and the rail front wall 67 that are substantially perpendicular to the direction of application of a side collision load, further improvement in the strength and rigidity against the side collision can be achieved.

As shown in FIG. 6, in the vehicle body superstructure, the roof arch 16 includes the arch vertical flanges 82, 82 each extending continuously between one of the first arch flanges 71, 71 and an adjacent one of the second arch flanges 72, 72, the arch vertical flanges 82, 82 extending along the rail vertical wall 64. With this arrangement, because the first arch flanges 71, 71 and the second arch flanges 72, 72 that are joined with the roof side rail 34 are connected by the respective arch vertical flanges 82, 82, there are formed two ridges 85 (FIG. 5) each extending between two adjacent ones 69a and 69b or 69c and 69d of the joint portions 69a-69e. The thus formed ridges 85 are effective to increase the strength and rigidity of the vehicle body side section 11B (FIG. 2).

In the vehicle body superstructure, as shown in FIG. 7, the roof arch 16 includes the arch beads 83, 83 formed by protruding longitudinal parts of the arch bottom wall 74 either in an upward direction or in a downward direction in such a manner as to extend continuously between one of the first arch flanges 71, 71 and an adjacent one of the second arch flanges 72, 72. With the arch beads 83, 83 thus formed, a plurality of ridges 84 (FIG. 5) is formed between two adjacent ones 69a and 69b or 69c and 69d of the joint portions 69a-69e. The ridges 84 contribute to further improvement in the strength and rigidity of the vehicle body side section 11B.

In the vehicle body superstructure, the pillar 24 extending in a downward direction from the joint portions 69a-69e between the roof side rail 34 and the roof arch 16. As shown in FIG. 10, the pillar 24 includes the pillar side wall 93 facing in opposite vehicle width directions, the pillar front wall 94 extending outward in the vehicle width direction from the front end 93a of the pillar side wall 93, and the pillar rear wall 95 extending outward in the vehicle width direction from the rear end 93b of the pillar side wall 93. The pillar front wall 94, the rail front wall 67 and the arch front wall 75 are formed to be continuous with one another in the vehicle width direction.

With this arrangement, when the pillar 24 is subjected to a load at a side collision, the side collision load first acts on the pillar front wall 94 extending perpendicular to an incident direction of the side collision load. The side collision load is subsequently transmitted from the pillar front wall 94 to the rail front wall 67 and the arch front wall 75 in succession. With this load transmission mechanism, the strength and rigidity against a side collision can be increased.

In the illustrated embodiment, the pillar of the vehicle body superstructure is a center pillar. The invention should by no means be limited to the illustrated embodiment, and a front pillar, a rear pillar or another pillar may be used as the pillar according to the invention.

INDUSTRIAL APPLICABILITY

With the arrangements so far described, the present invention is particularly suitable for application in a vehicle body superstructure of a passenger car such as a sedan or a wagon.

REFERENCE SIGNS LIST

11B: vehicle body side section
15: roof panel
15a: outer end portion, in the vehicle width direction, of roof panel
16: roof arch
24: pillar (center pillar)
34: roof side rail
51: slide rail for sliding door
61: rail flange
61a: outer end, in the vehicle width direction, of the rail flange
61b: lower surface of rail flange
64: rail vertical wall
64a: lower end of rail vertical wall
65: rail bottom wall
65b: lower surface of rail bottom wall
66: bulging section
66a: front end of bulging section
67: rail front wall
69a-69e: joint portion (spot-welded joint portion) between roof side rail and roof arch
71: first arch flange
72: second arch flange
74: arch bottom wall
74a, 74b: front and rear ends of arch bottom wall
75: arch front wall
75a: upper end of arch front wall
76: arch rear wall
76a: upper end of arch rear wall
77: arch front flange
78: arch rear flange
81: hat-shaped cross section
82: arch vertical flange
83: arch bead
93: pillar side wall
94: pillar front wall
95: pillar rear wall

The invention claimed is:

1. A vehicle body superstructure comprising:
a roof side rail extending in a front-rear direction of a vehicle body on and along an upper part of a vehicle body side section;
a roof panel having an outer end portion, in a vehicle width direction, thereof mounted on the roof side rail; and
a roof arch extending in the vehicle width direction below the roof panel, wherein
the roof side rail includes:
a rail flange on which the roof panel is mounted;
a rail vertical wall hanging down from an outer end, in the vehicle width direction, of the rail flange;
a rail bottom wall extending from a lower end of the rail vertical wall to the outside in the vehicle width direction; and
a bulging section formed by allowing the rail bottom wall and the rail vertical wall to bulge toward a center in the vehicle width direction in order to accommodate a slide rail for a sliding door, and
the roof arch has:
an outer end portion, in the vehicle width direction, thereof directly joined to the bulging section, the outer end portion having a front end joined directly to a front end of the bulging section, and a rear end joined directly to a rear end of the bulging section;
first arch flanges directly joined to and along a lower surface of the rail flange, the rail flange being inclined upwardly toward the center in the vehicle width direction of the vehicle body; and
second arch flanges directly joined to a lower surface of the rail bottom wall.

2. The vehicle body superstructure of claim 1, wherein the roof arch has a hat-shaped cross section defined by an arch bottom wall facing in opposite vertical directions of the vehicle body, an arch front wall and an arch rear wall rising, respectively, from front and rear ends of the arch bottom wall, an arch front flange extending forwardly from an upper end of the arch front wall, and an arch rear flange extending rearwardly from an upper end of the arch rear wall, wherein outer end portions, in the vehicle width direction, of the arch front and rear flanges constitute the first arch flanges, and wherein opposite outer ends, in the vehicle width direction, of the arch bottom wall constitute the second arch flanges.

3. The vehicle body superstructure of claim 2, wherein the roof side rail includes a rail front wall rising from a front end of the bulging section and being continuous with the rail vertical wall, and the rail front wall and the arch front wall are formed to be continuous with each other in the vehicle width direction.

4. The vehicle body superstructure of claim 1, wherein the roof arch includes arch vertical flanges each extending continuously between one of the first arch flanges and an adjacent one of the second arch flanges, the arch vertical flanges extending along the rail vertical wall.

5. The vehicle body superstructure of claim 2, wherein the roof arch includes an arch bead formed by protruding a longitudinal part of the arch bottom wall either in an upward direction or in a downward direction, the arch bead extending continuously between one of the first arch flanges and an adjacent one of the second arch flanges.

6. The vehicle body superstructure of claim 3, further comprising a pillar extending in a downward direction from joint portions between the roof side rail and the roof arch, wherein the pillar includes a pillar side wall facing in opposite vehicle width directions, a pillar front wall extending outward in the vehicle width direction from a front end of the pillar side wall, and a pillar rear wall extending outward in the vehicle width direction from a rear end of the pillar side wall, and wherein the pillar front wall, the rail front wall, and the arch front wall are formed to be continuous with one another in the vehicle width direction.

* * * * *